United States Patent
Tanaka et al.

[19]

[11] Patent Number: 6,065,804
[45] Date of Patent: May 23, 2000

[54] REMOVABLE FOLDING SEAT

[75] Inventors: Masami Tanaka, Toyota; Yasuji Morinishi, Okazaki; Shingo Kutomi, Nishikamo-gun; Masahiro Tomida; Masatoshi Ushida, both of Inuyama, all of Japan

[73] Assignees: Mitsubishi Jidosha Kogyo Kabushiki Kaisha, Tokyo; Kabushik Kaisha Imasen Denki Seisakusho, Aichi-ken, both of Japan

[21] Appl. No.: 09/168,172

[22] Filed: Oct. 8, 1998

[30] Foreign Application Priority Data

Oct. 8, 1997 [JP] Japan .................................... 9-275892
Oct. 9, 1997 [JP] Japan .................................... 9-276804

[51] Int. Cl.$^7$ ...................................................... B60N 2/10
[52] U.S. Cl. ........................................ 297/336; 296/65.03
[58] Field of Search ..................... 296/65.03; 248/503.1; 297/336

[56] References Cited

U.S. PATENT DOCUMENTS

| | | |
|---|---|---|
| 5,238,285 | 8/1993 | Holdhampf et al. ................. 296/65.03 |
| 5,282,662 | 2/1994 | Bolsworth et al. ................. 296/65.03 |
| 5,330,245 | 7/1994 | Boisset . |
| 5,498,051 | 3/1996 | Sponsler et al. . |
| 5,577,805 | 11/1996 | Glinter et al. .................... 296/65.03 X |
| 5,626,391 | 5/1997 | Miller et al. ..................... 296/65.03 X |
| 5,634,686 | 6/1997 | Okazaki ........................... 296/65.03 X |
| 5,671,965 | 9/1997 | O'connor ............................. 297/336 X |
| 5,810,443 | 9/1998 | Blanchard ......................... 296/65.03 X |

FOREIGN PATENT DOCUMENTS

| | | |
|---|---|---|
| 0546908B1 | 6/1993 | European Pat. Off. . |
| 5262170 | 10/1993 | Japan . |

*Primary Examiner*—Peter M. Cuomo
*Assistant Examiner*—David E. Allred

[57] ABSTRACT

A removable folding seat is equipped with a first locking member to lock the front lower portion of a seat frame removably to a floor, a second locking member to lock the rear lower portion of the seat frame removably to the floor, and a third locking member to hold the seat in a folding position. The first and third locking members are simultaneously driven by a first lever. The second and third locking members are driven by the common second lever. When the seat is in a seating position, the second lever is allowed to drive the second locking member and inhibited from driving the third locking member. Also, when the seat is in the folding position, the second lever is inhibited from driving the second locking member and allowed to drive the third locking member.

35 Claims, 10 Drawing Sheets

REMOVABLE FOLDING SEAT

BACKGROUND OF THE INVENTION

The present invention relates generally to a removable folding seat, and more specifically to a removable folding seat suitable for use in automobiles.

Conventionally, several types of seats for vehicles, such as automobiles, with the folding function and the removing function have been proposed and practically used. With those seats, the space within a compartment of the vehicle can be efficiently used.

As an example of a seat equipped with such folding and removing functions, a description thereof will hereinafter be made in reference to FIGS. 9 and 10.

In these figures, 101 is a seat, provided in the compartment of an automobile, which comprises a seat back 102, a seat cushion 103, and a seat leg portion 104. 105 denotes a floor of the automobile.

Multiple latch mechanisms, engageable with front and rear strikers (not shown) secured to the floor 105, are provided on the front lower portion 104A and rear lower portion 104B of the seat leg portion 104. When the seat 101 is in an ordinary seating position, the seat 101 is locked to the floor 105 by the latch mechanisms.

The rear latch mechanism, provided on the rear lower portion 104B of the seat leg portion 104, can be removed from the rear striker. For instance, if a folding lever (not shown) is operated, the engagement between the rear lower portion 104B and the rear striker will be released.

The front latch mechanism, provided on the front lower portion 104A of the seat leg portion 104, is rotatable and removable with respect to the front striker. In other words, this front latch mechanism functions as a removable hinge. With this hinge function, the seat 101 is rotatable forward around the front lower portion 104A which serves as an axis of rotation, by releasing the engagement between the rear striker and the rear lower portion 104B.

Furthermore, the seat 101 can be removed from the floor 105 by releasing the engagement between the front striker and the front lower portion 104A and the engagement between the rear striker and the rear lower portion 104B.

As shown in FIG. 10, the seat 101 is provided with a removing lever 121 for disengaging the front latch mechanism provided on the front lower portion 104A from the front striker. The engagement between the front lower portion 104A and the front striker can be released by operating the removing lever 121 while the seat 101 has been folded, whereby the seat 101 can be removed from the floor 105.

When the above-mentioned seat 101 is folded, initially the seat back 102 is reclined in a direction of arrow "a" in FIG. 9 and folded onto the seat cushion 103. Then, the engagement between the rear lower portion 104B and the rear striker is released by operating the folding lever (not shown). Furthermore, if the rear end portion of the seat cushion 103 is tilted up with respect to the front lower portion 104A, the entire seat 101 will be rotated in a direction of arrow "b". In this manner, the seat 101 is caused to be in a folded state, as shown in FIG. 10, and the luggage compartment of the vehicle is substantially enlarged.

Note that the position of the seat 101 in the folded state will hereinafter be referred to as the folding position.

If, in the state in which the seat 101 shown in FIG. 10 is in the folding position, the engagement between the front lower portion 104A and the front striker can be released by the operation of the removing lever 121, and the entire seat 101 can be removed from the floor 105.

As described above, with the seat folding and removing functions, the luggage compartment space can be varied according to the quantity of luggage.

The aforementioned conventional seat, however, has the following problems.

For instance, the seat 101 shown in FIG. 10 is prevented from tilting forward by a guide plate 110, but, since the seat 101 does not have any lock mechanism to hold the seat 101 in the folding position, the seat 101 is not reliably held in the folding position. Therefore, the seat 101 may return to the seating position when the vehicle is started or accelerated.

On the other hand, as shown in FIG. 11, if the seat 101 is provided with a lock mechanism 115 for holding the seat 101 in the folding position, the seat 101 will be prevented from returning to the seating position when the vehicle is started or accelerated.

The lock mechanism 115 is constituted, for example, as a self-lock mechanism which locks the seat 101 to the floor 105 in the folding position if the seat 101 is rotated from the seating position to the folding position.

However, the lock mechanism 101 shown in FIG. 11 requires two levers: a release lever 120 for releasing the lock mechanism 115 and a removing lever 121 for releasing the engagement between the front lower portion 104A and the front striker. Therefore, when removing the seat 101 from the floor 105, the two levers 120 and 121 must be operated at the same time and thus the operation becomes complicated.

In European Patent No. 0 546 908 and the corresponding U.S. Pat. No. 5,330,245 a removable folding seat is disclosed.

However, the seat disclosed in FIG. 1 of European Patent No. 0 546 908 (or U.S. Pat. No. 5,330,245) has no lock mechanism for locking the seat reliably to the floor when the seat is in the folding position. The seat disclosed in FIG. 2 of European Patent No. 0 546 908 (or U.S. Pat. No. 5,330,245) can be removed from the floor only when it is in a particular position between the seating position and the folding position. Therefore, the seat disclosed in European Patent No. 0 546 908 (or U.S. Pat. No. 5,330,245) also has the above-mentioned problems.

SUMMARY OF THE INVENTION

It is an object of the present invention to provide a removable folding seat that can be locked to or removed from a floor with reliability in a folding position thereof.

Another object of the present invention is to provide a removable folding seat with a mechanism for holding the seat in the folding position and a mechanism for locking the seat removably to the floor, which can be easily operated.

To achieve the aforementioned objects, there is provided a removable folding seat comprising: a first support bracket provided on a front lower portion of the seat frame so that it is freely rotatable; a first locking member to lock the first support bracket removably to a floor; a first lever to drive the first locking member between a first locking position in which the first support bracket is locked to the floor and an unlocking position in which the first support bracket is disengageable from the floor; a second support bracket provided on a rear lower portion of the seat frame; a second locking member to lock the second support bracket removably to the floor; a second lever to drive the second locking member between a second locking position in which the second support bracket is locked to the floor and a disengaging position in which the second support bracket is disengageable from the floor; and a third locking member to hold the seat in a folding position; wherein the third locking member is driven either by the first lever or by the second lever.

Therefore, the removable folding seat according to the present invention can be reliably locked to the floor in the folding position. Further, the mechanism for holding the seat in the folding position and the mechanism for locking the seat removably to the floor can be easily operated.

Also, in the removable folding seat according to the present invention, both the first locking member, provided on the front lower portion of the seat frame for locking the seat removably to the floor, and the third locking member to hold the seat in the folding position are driven by the common first lever. Thus, the first and third locking members are simultaneously driven by the first lever.

In addition, in the removable folding seat according to the present invention, both the second locking member, provided on the rear lower portion of the seat frame for locking the seat removably to the floor, and the third locking member to hold the seat in the folding position are driven by the common second lever.

Furthermore, when the seat is in the seating position, the second lever is allowed to drive the second locking member and inhibited from driving the third locking member.

Moreover, when the seat is in the folding position thereof, the second lever is inhibited from driving the second locking member and allowed to drive the third locking member.

BRIEF DESCRIPTION OF THE DRAWINGS

The present invention will be described in further detail with reference to the accompanying drawings wherein.

DETAILED DESCRIPTION OF THE PREFERRED EMBODIMENT

Figure 7:
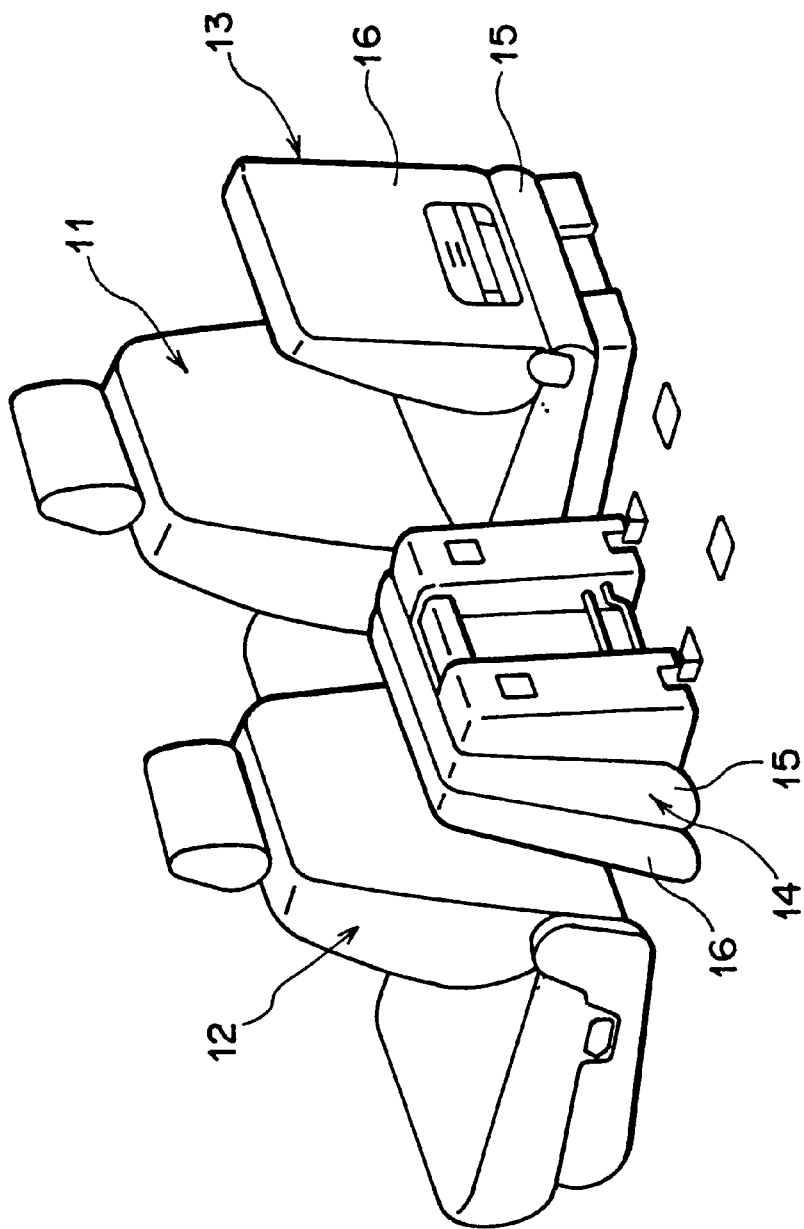
FIG. 7 is a perspective view showing the seat folded and locked to the floor in accordance with the present invention.

In FIG. 7, right and left rear seats 13 and 14, as an embodiment of the present invention, are disposed behind the right and left front seats 11 and 12 of a vehicle.

Each of the right and left rear seats 13 and 14 has a seat cushion 15 and a seat back 16 rotatably supported on the rear portion of the seat cushion 15. The seat back 16 can be locked at a predetermined angular position with respect to the seat cushion 15.

The rear seats 13 and 14 can be folded by tilting up the seat cushion 15 along with the seat back 16 from the forward reclined position when the seat back 16 is reclined fully forward. Furthermore, the rear seats 13 and 14 can be removed from the floor when they are in the folding positions.

As the right and left rear seats 13, 14 are substantially identical in operation and structure with each other, a detailed description will hereinafter be made of the right rear seat 13.

Figure 1:
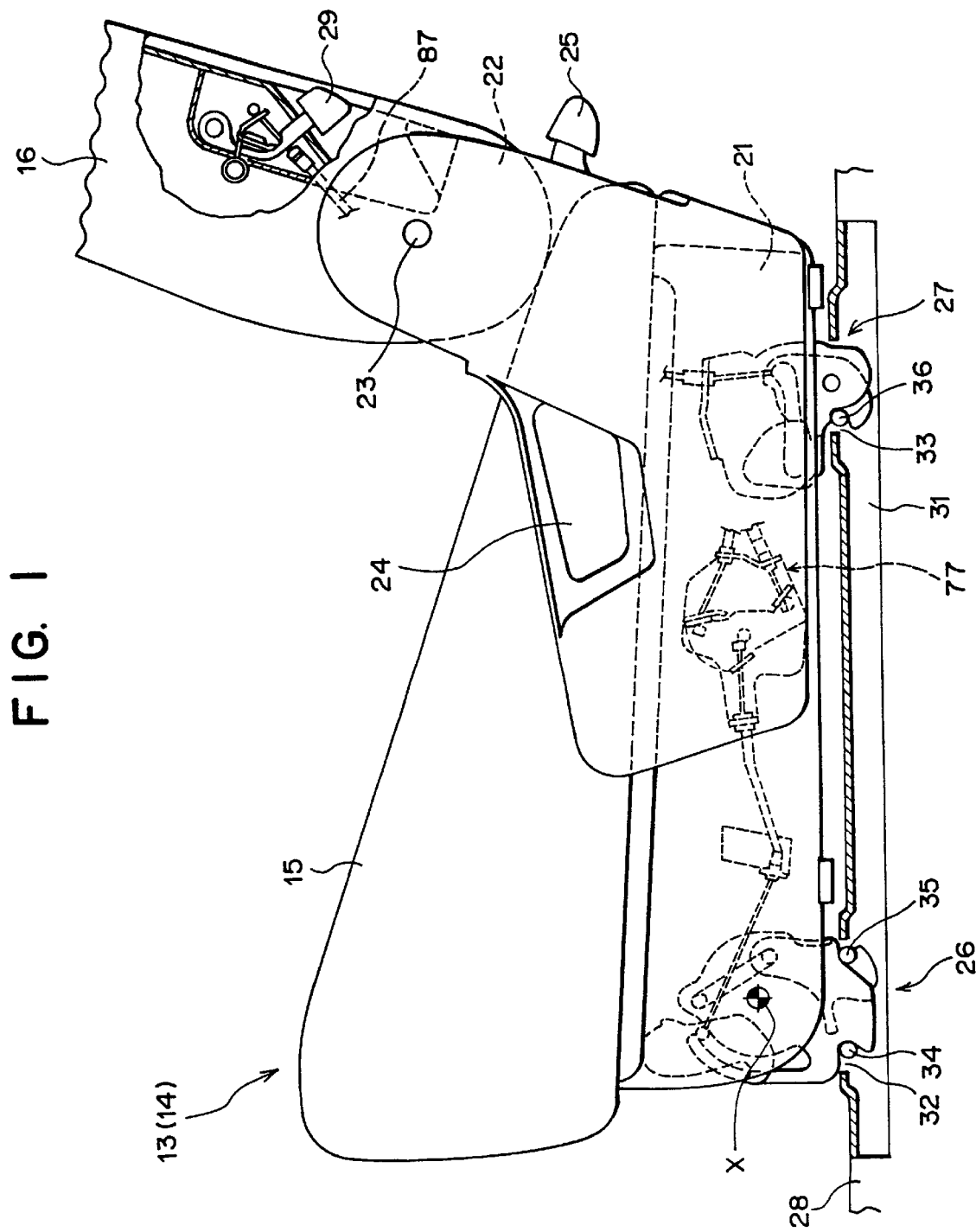
FIG. 1 is a side view showing a seat according to the present invention.
Figure 3:
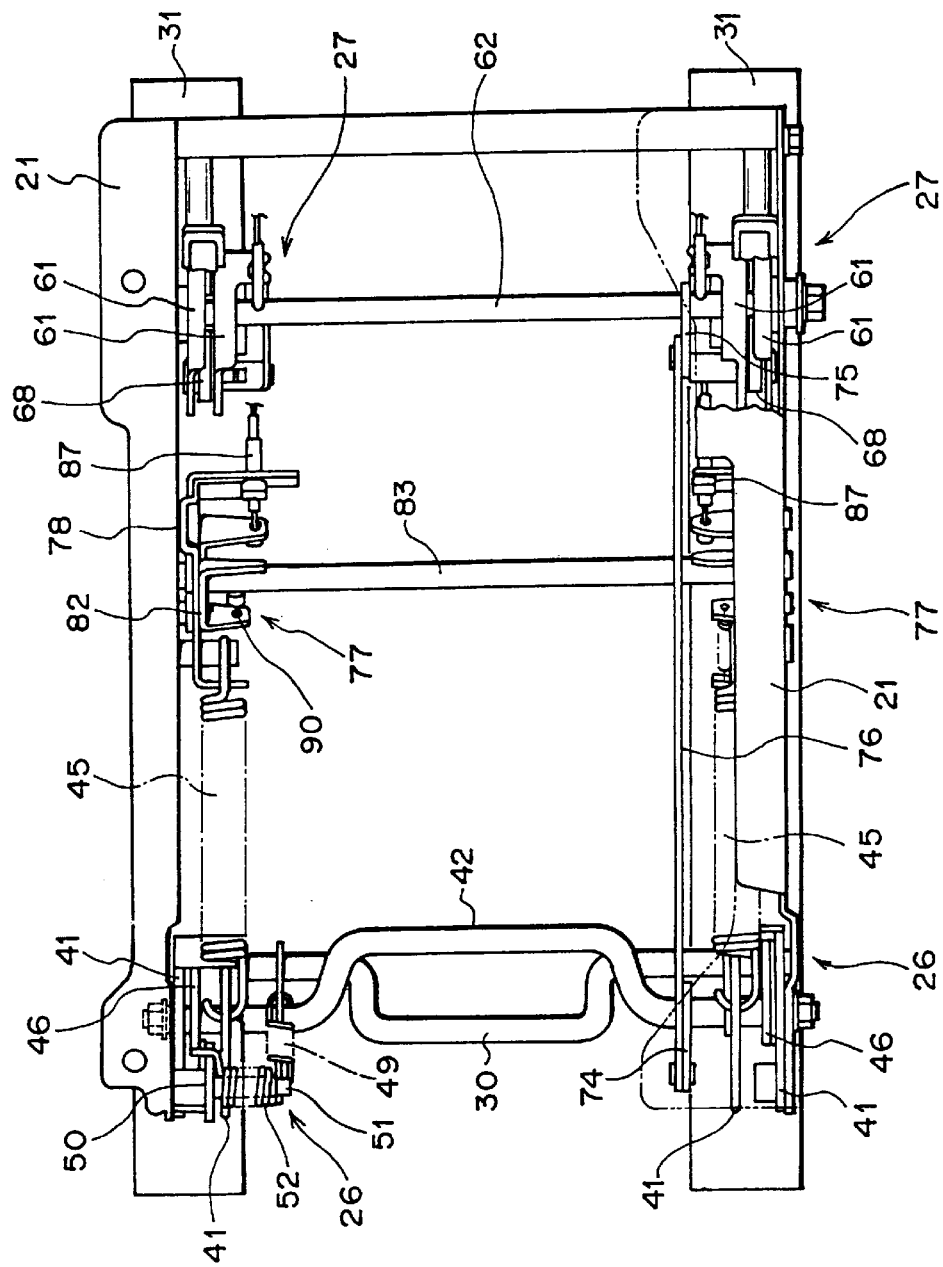
FIG. 3 is a plan view showing the seat shown in FIG. 1.

As shown in FIGS. 1 and 3, the seat cushion 15 of the rear seat 13 is mounted on right and left seat frames 21, 21, each of which extends in a fore-and-aft (longitudinal) direction of the vehicle.

In FIGS. 1 through 5, the left side is forward and the right side is rearward with respect to a passenger seated.

As shown in FIG. 1, connecting brackets 22, 22 extend upward from the rear ends of the seat frames 21, 21, respectively. The seat back 16 is rotatably supported at its lower end by the connecting brackets 22, 22.

The seat 13 is equipped with a reclining mechanism (not shown). The reclining mechanism can adjust the angular position of the seat back 16 by the operation of a reclining lever 24. The seat back 16 can be reclined fully forward by the operation of a forward reclining lever 25 so that the seat back 16 and the seat cushion 15 are closely attached with each other.

The front lower portion of the seat frame 21 is provided with a front lock mechanism 26 engageable with a first striker 35 and a third striker 34 both of which are secured to the floor 28. The front lock mechanism 26 has the function of rotatably and removably locking the front lower portion of the seat frame 21 to the floor 28 and also has the function of maintaining the folding position of the seat 13 in the folding position.

The rear lower portion of the seat frame 21 is provided with a rear lock mechanism 27 engageable with a second striker 36 secured to the floor 28. The rear lock mechanism 27 has the function of locking the rear lower portion of the seat frame 21 removably to the floor 28.

Figure 2:
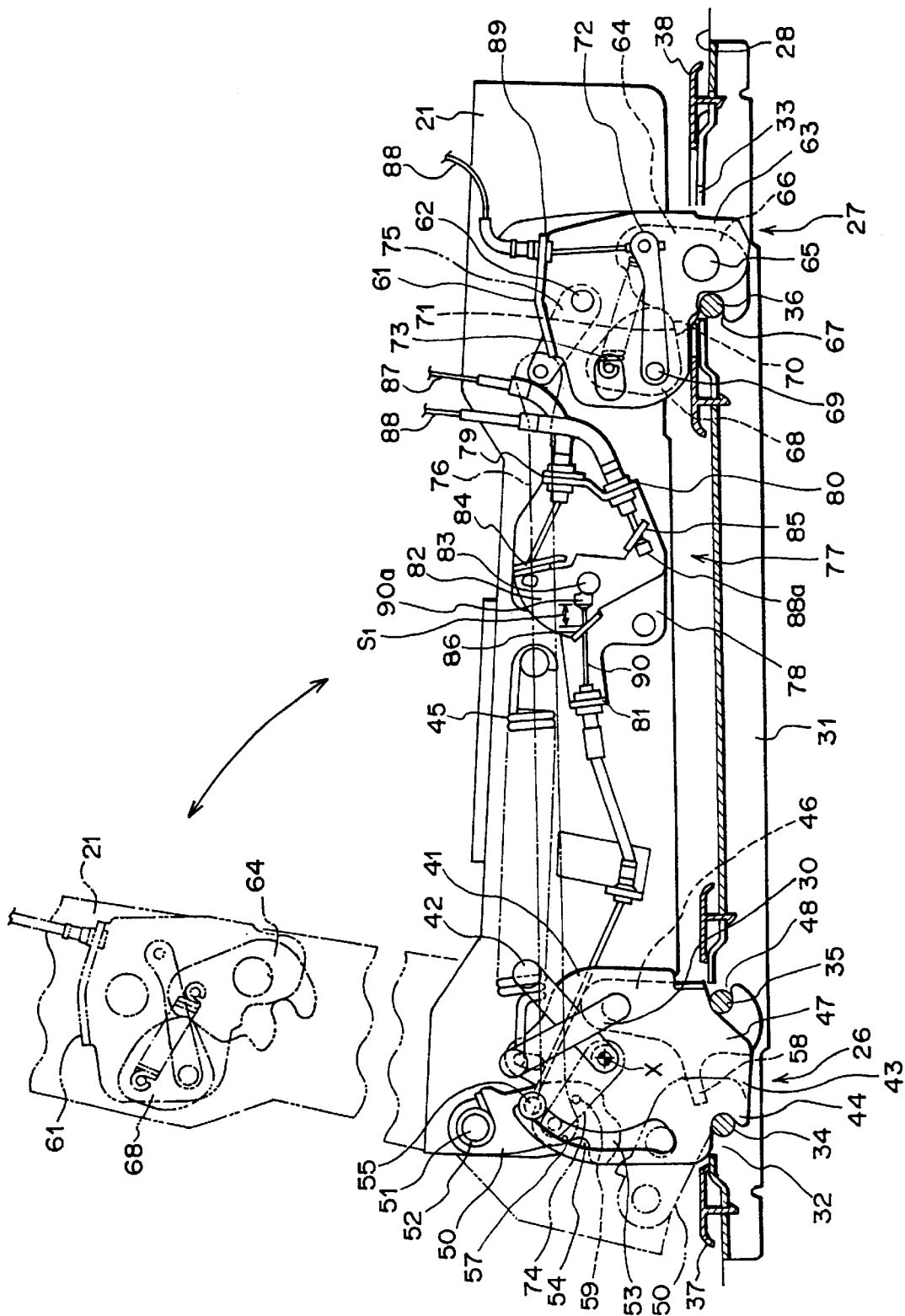
FIG. 2 is a side view showing the detailed structure of the seat shown in FIG. 1.

As shown in FIGS. 1 through 3, right and left reinforcing members 31, 31 are attached to the floor 28 along the longitudinal direction of the vehicle, and a front opening 32 and a rear opening 33 are formed in the front and rear upper surfaces of each reinforcing member 31.

The first and third strikers 35 and 34 are secured to fore and aft edges of the front opening 32, respectively, while the second striker 36 is secured to a fore edge of the rear opening 33. As shown in FIG. 2, the front and rear openings 32 and 33 have front and rear covers 37 and 38 attached thereto, respectively.

Figure 4:
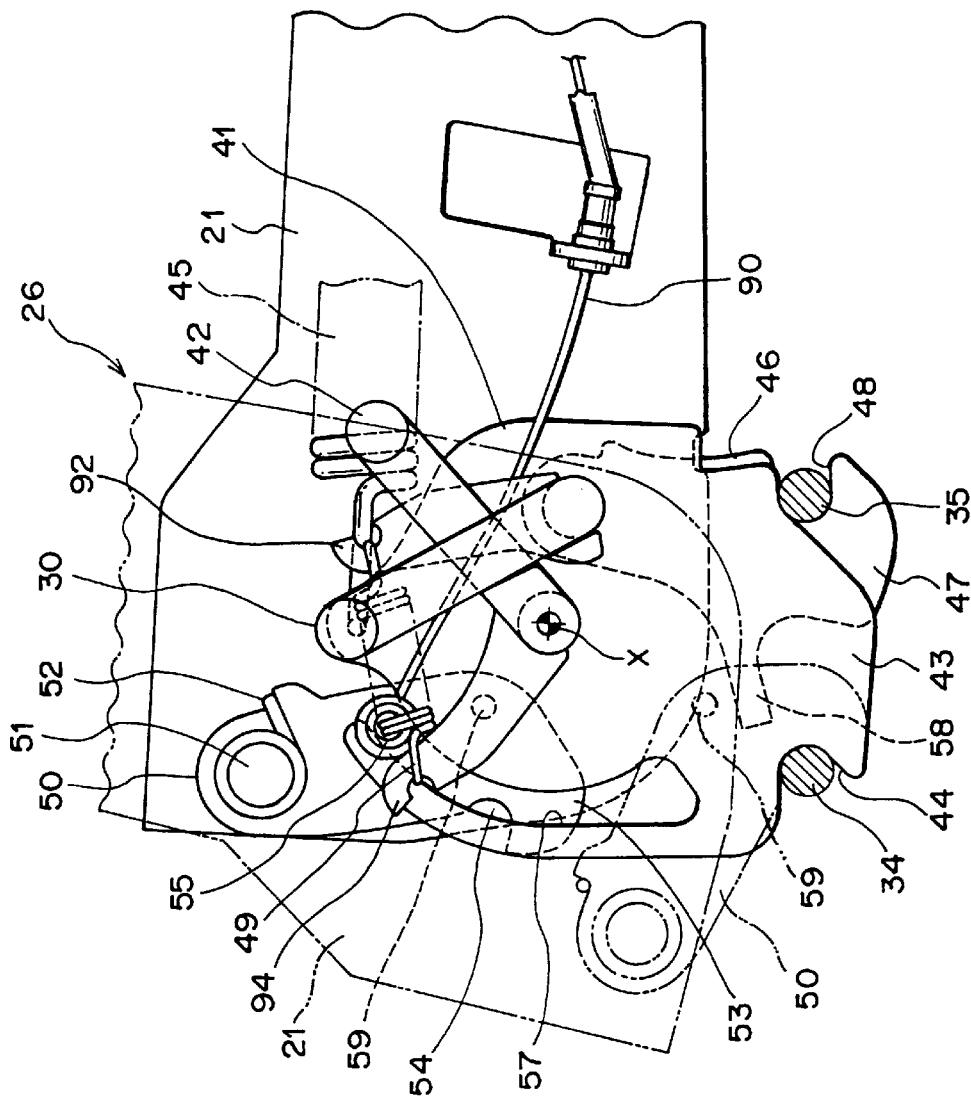
FIG. 4 is an enlarged side view showing the front portion of the seat frame of the seat shown in FIG. 1.

As shown in FIGS. 2 through 4, first support brackets 41, 41 are rotatably supported on the front portions of the right and left seat frames 21, 21. In other words, the right and left seat frames 21, 21 are rotatable around an axis X with respect to the first support brackets 41, 41.

The right and left first support brackets 41, 41 are connected together by an auxiliary lever 42 having an intermediate crank portion. Therefore, the right and left support brackets 41, 41 and the auxiliary lever 42 can rotate as a unit with respect to the seat frames 21, 21. Each of the support brackets 41, 41 is provided at the lower end thereof with a guide portion 43 which can be inserted into or removed from the front opening 32. The guide portion 43 further includes a hook portion 44, which is in turn engageable with the third striker 34.

A spring 45 is interposed between the seat frame 21 and the first support bracket 41 to urge the seat frame 21 to rotate in a counterclockwise direction in FIG. 2 with respect to the first support bracket 41.

Right and left locking plates 46, 46, as first locking members, are rotatably supported on the right and left first support brackets 41, 41, respectively. The right and left first locking plates 46, 46 are connected together by a first lever 30 having an intermediate crank portion. Therefore, the right and left first locking plates 46, 46 and the first lever 30 can rotate as a unit with respect to the first brackets 41, 41.

Each of the first locking plates 46, 46 is provided integrally, at the lower end thereof, with a guide portion 47 which can be inserted into or removed from the front opening 32. Furthermore, the guide portion 47 includes a first slot 48 which can receive the first striker 35.

More specifically, each of the first locking plates 46, 46 has a locking position in which the first striker 35 is received within the first slot 48 and an unlocking position in which the first striker 35 is located outside the first slot 48.

A spring 49 is interposed between an arm 92 connected to the first lever 30 and another arm 94 connected to the auxiliary lever 42 to urge the first locking plate 46 to rotate in the counterclockwise direction in FIG. 2 with respect to the first support bracket 41.

Furthermore, on one of the seat frames 21, 21, a third locking plate 50, as a third locking member, is rotatably supported around a support shaft 51. A coil spring 52 is wound around the support shaft 51 to urge the third locking plate 50 to rotate in the clockwise direction in FIG. 4 with respect to the seat frame 21.

The lower portion of the third locking plate 50 is provided integrally with a guide portion 53 which can be inserted into or removed from the front opening 32. Furthermore, the guide portion 53 includes a third slot 54 which can receive the third striker 34.

More specifically, the locking plate 50 has a holding position in which the third striker 34 is received within the third slot 54 and a releasing position in which the third striker 34 is located outside the third slot 54.

A guide pin 55 is attached to the third locking plate 50, while the first support bracket 41 has a corresponding guide slot 57 into which the guide pin 55 projects.

A protruding portion 58 is formed integrally on the first locking plate 46 adjacent to the third locking plate 50, and a releasing pin 59 is attached to the third locking plate 50.

As shown by solid lines in FIGS. 2 and 4, when the hook portion 44 of the first support bracket 41 engages the third striker 34 and when the first slot 48 of the first locking plate 46 engages the first striker 35, the front lower portion of the seat frame 21 is locked to the floor 28.

And if, from this state, the seat frame 21 is tilted up toward the forward and upward directions, the guide pin 55 of the third locking plate 50 will be moved along the guide slot 57 of the first support bracket 41 according to the upward rotation of the seat frame 21.

At the same time, the movement of the guide pin 55 causes the third locking plate 50 to rotate in the clockwise direction in FIGS. 2 and 4 with respect to the seat frame 21. As shown by a two-dotted chain line in FIG. 4, the third slot 54 of the third locking plate 50 engages with the third striker 34, whereby the seat frame 21 (rear seat 13) is locked to the floor 28 in the folding position.

If, when the seat frame 21 is locked in the folding position, the first lever 30 is rotated in the clockwise direction in FIG. 2 toward the auxiliary lever 42, the first locking plate 46 will be rotated in the same direction and the first slot 48 of the first locking plate 46 will be disengaged from the first striker 35. The clockwise rotation of the first locking plate 46 causes the protruding portion 58 of the first locking plate 46 to push up the releasing pin 59 on the third locking plate 50, whereby the third locking plate 50 is disengaged from the third striker 34. Therefore, the engagement between the seat frame 21 and the floor 28 is released. In this state It is possible either to return the rear seat 13 to the seating position by the rear downward rotation of the seat frame 21 or to remove the rear seat 13 by the upward lifting of the seat frame 21.

Figure 5:
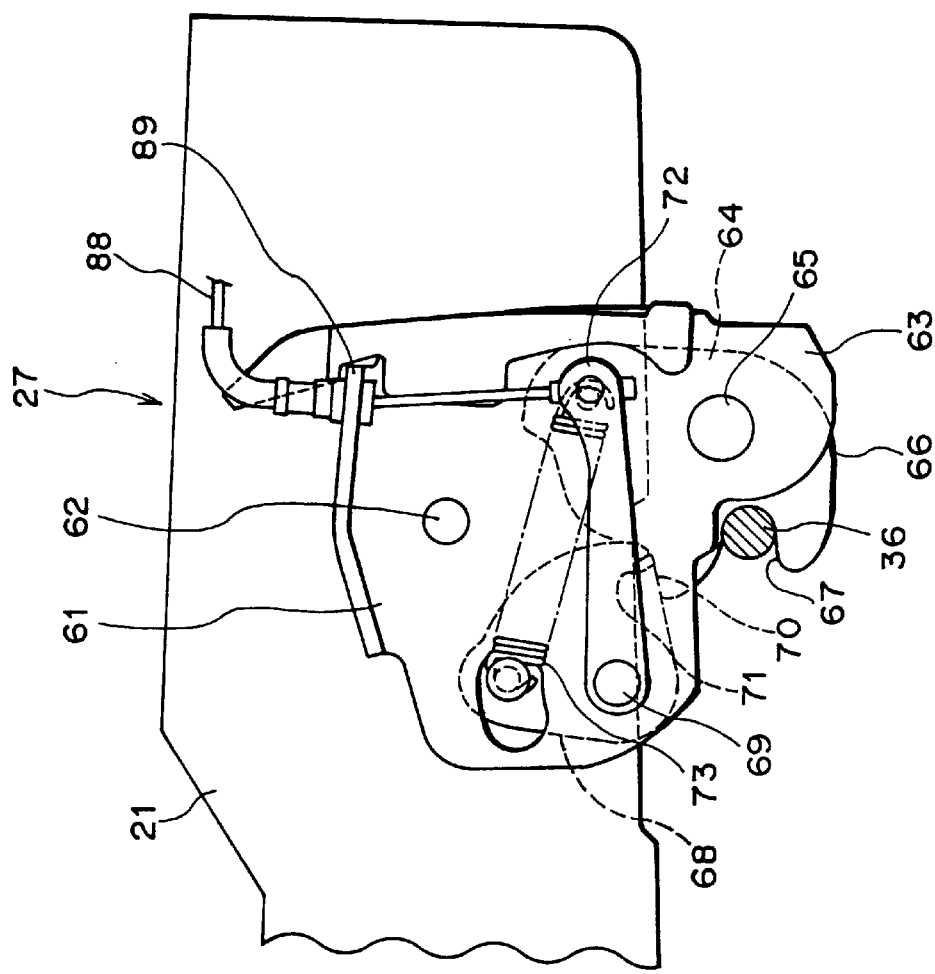
FIG. 5 is an enlarged side view showing the rear portion of the seat frame of the seat shown in FIG. 1.

On the other hand, as shown in FIGS. 2, 3, and 5, second support brackets 61, 61 are rotatably supported on the rear portions of the right and left frames 21, 21.

The second support brackets 61, 61 are connected together by a connecting rod 62. Therefore, the right and left second support brackets 61, 61 and connecting rod 62 can rotate as a unit with respect to the right and left frames 21, 21.

Each of the second support brackets 61, 61 is provided, at the lower end thereof, with a guide portion 63 which can be inserted into or removed from the aforementioned rear opening 33, and at the upper end thereof with a cable tube attaching portion.89 to which a cable tube is attached.

Second locking plates 64, 64, as second locking members, are rotatably supported on the right and left second support brackets 61, 61, respectively. The second locking plates 64, 64 are connected together by a connecting rod 65. Therefore, the right and left second locking plates 64, 64 and the connecting rod 65 can rotate as a unit with respect to the second support brackets 61, 61.

Each of the second locking plates 64, 64 is provided integrally at the lower end thereof with a guide portion 66 which can be inserted into or removed from the rear opening 33. This guide portion 66 includes a second slot 67 which can receive the second striker 36 therein.

On the second support brackets 61, 61, cam members 68, 68 are rotatably supported adjacent to the second locking plates 64, 64, respectively, by a support shaft 69. Each of the cam members 68, 68 has a cam surface 70, which is in turn engageable with the abutting surface 71 of the second locking plate 64.

A cable connecting lever 72 is connected to each of the cam members 68, 68, and each pair of the cam member 68 and cable connecting lever 72 can rotate as a unit with respect to the second support bracket 61.

A spring 73 is interposed between the cam member 68 and the second locking plate 64, and as shown in FIG. 5, the spring 73 urges the cam member 68 to rotate in the clockwise direction and the second locking plate 64 to rotate in the counterclockwise direction, respectively.

As shown in FIGS. 2 and 3, on a side opposite to the third locking plate 50 in the lateral direction of the seat 13, front and rear connecting arms 74 and 75 extend from the auxiliary lever 42 and the connecting rod 62, respectively. The front connecting arm 74 and rear connecting arm 75 are connected by a connecting link 76. Therefore, the first and second support brackets 41 and 61 are rotatable in synchronization with each other with respect to the seat frame 21.

As shown in FIGS. 2 and 5, when the second slot 67 of the second locking plate 64 engages the second striker 36, the rear lower portion of the seat frame 21 is locked to the floor 28.

If, when the rear lower portion of the seat frame 21 is locked to the floor 28, the passenger operates the cable connecting lever 72, the cam member 68 will be rotated in the counterclockwise direction in FIGS. 2 and 5 and the cam surface 70 of the cam member 68 will be disengaged from the abutting surface 71 of the second locking plate 64. Then, the urging force of the spring 73 causes the second locking plate 64 to rotate in the counterclockwise direction. Thus, the second striker 36 is disengaged from the second slot 67 of the second locking plate 64, whereby the engagement between the rear lower portion of the seat frame 21 and the floor 28 is released. And if, from this state, the seat frame 21 is tilted up toward the forward direction, as previously described, the third slot 54 of the third locking plate 50 will engage with the third striker 34, whereby the seat frame 21 (rear seat 13) will be locked in the folding position with respect to the floor 28.

When the seat frame 21 is tilted up toward the forward direction, the relative rotation between the first support bracket 41 and the seat frame 21 is transferred to the second support bracket 61 through the connecting link 76, whereby the second support bracket 61 rotates in the clockwise direction in FIG. 2. Therefore, when the seat 13 is in the folding position, as shown by a two-dotted line in FIG. 2, the second support bracket 61 is housed within the seat frame 21 tilted up.

Incidentally, as shown in FIG. 1, a second lever 29 for rotating the second locking plate 64 and the third locking plate 50 is attached to the rear surface of the seat back 16. The rear seat 13 is equipped with right and left transfer mechanisms 77, 77. Each transfer mechanism 77 inhibits the second lever 29 from rotating the third locking plates 50, 50 when the rear seat 13 is in the seating position and also allows the second lever 29 to rotate the third locking plates 50, 50 when the rear seat 13 is in the folding position.

Figure 6:
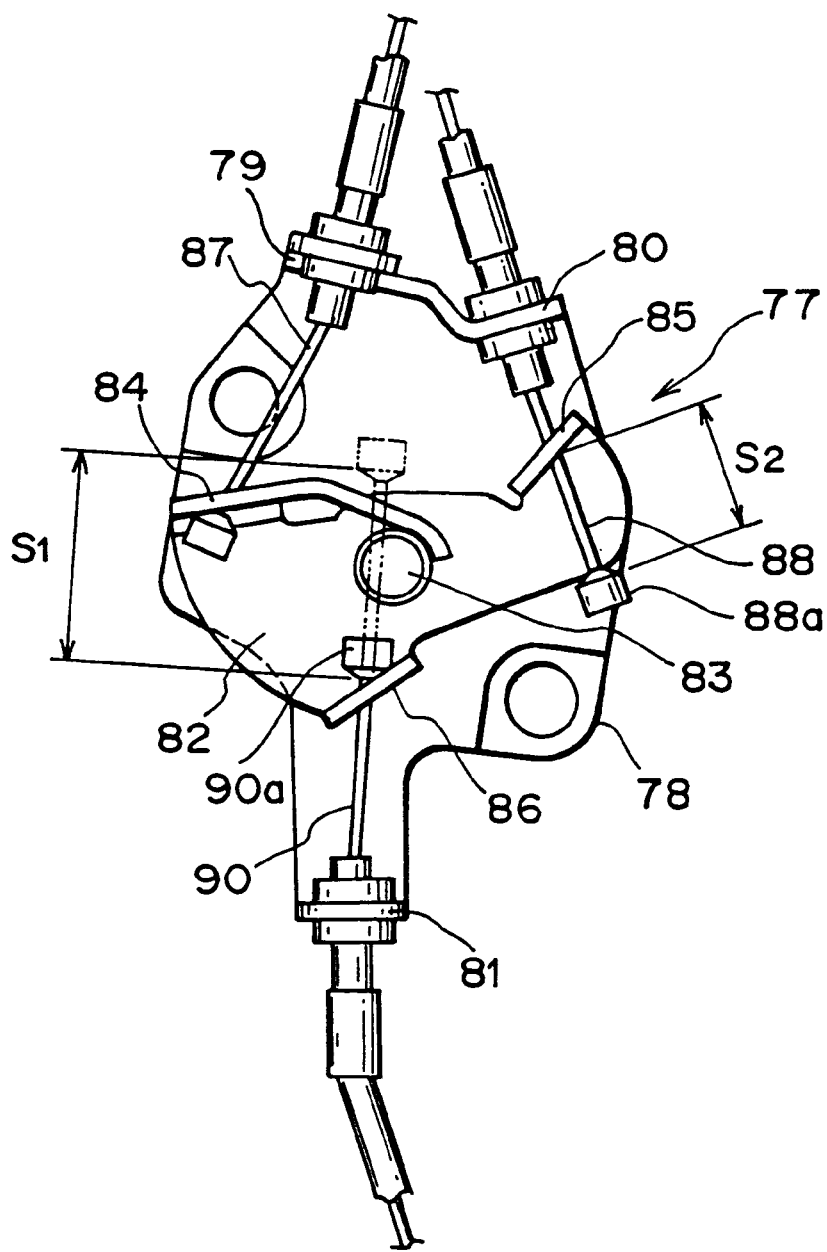
FIG. 6 is an enlarged side view used to explain the transfer mechanism of the seat shown in FIG. 1.

As shown in FIGS. 2, 3, and 6, the right and left transfer mechanisms 77, 77 are attached to the right and left seat frames 21, 21 through right and left support brackets 78, 78, respectively. Each support bracket 78 has cable tube attaching portions 79, 80, and 81 to which cable tubes are respectively attached. A lateral rod 83 extending in the lateral direction of the seat 13 is rotatably supported by the support brackets 78, 78.

Transfer links 82, 82 are fixed near the opposite end portions of the lateral rod 83. Each transfer link 82 is formed integrally with cable connecting portions 84, 85, and 86 to which the end portions of cables 87, 88, and 90 are respectively connected.

The second lever 29 on the rear surface of the seat back 16 and the cable connecting portion 84 of each transfer link 82 are connected together by the first cable 87 through the cable tube attaching portion 79. That is, a pair of first cables 87, 87 are disposed between the second lever 29 and the right cable connecting section 84 and between the second lever 29 and the left cable connecting section 84, respectively.

In addition, the cable connecting lever 72, which is integral with the cam member 68, and the cable connecting portion 85 of the transfer link 82 are connected together by the second cable 88 through the cable tube attaching portions 80 and 89. In other word, a pair of second cables 88, 88 are disposed between the left cable connecting lever 72 and the left cable connecting sections 84 and between the right cable connecting lever 72 and the right cable connecting sections 84, respectively.

Furthermore, the guide pin 55 of the third locking plate 50 and the cable connecting portion 86 of the transfer link 82 are connected together by the third cable 90 through the cable tube attaching portion 81. Namely, a single third cable 90 is disposed between the third locking plate 50 and one of the right and left transfer links 82, 82.

In the above-mentioned cable connecting structure, when the seat 13 is in the seating position thereof, lost motion stroke S1 is provided between the end portion 90a of the third cable 90 (indicated by a two-dotted line in FIG. 6) and the cable connecting portion 86 of the transfer link 82, as shown in FIGS. 2 and 6.

When, on the other hand, the seat 13 is in the folding position, the lost motion stroke S1 is absorbed by rotation of the third locking plate 50, so that the end portion 90a of the third cable 90 (indicated by a solid line in FIG. 6) and the cable connecting portion 86 of the transfer link 82 are closely attached with each other.

Furthermore, in the folding position of the seat 13, lost motion stroke S2 is provided between the end portion 88a of the second cable 88 and the cable connecting portion 85 of each transfer link 82, as shown in FIG. 6.

Therefore, when the seat 13 is in the seating position, if the passenger operates the second lever 29, each of the first cables 87, 87 will be pulled up and each transfer link 82 will be rotated in the clockwise direction in FIG. 2. With the clockwise rotation of the transfer link 82, each of the second cables 88, 88 is pulled and each cam member 68 is rotated in the counterclockwise direction in FIG. 2. And each of the second locking plates 64, 64 are also rotated in the counterclockwise direction, whereby the engagement between the second slot 67 of the second locking plate 64 and the second striker 36 is released.

Therefore, the rear seat 13 can be tilted up toward the forward direction.

Note that since the lost motion stroke S1 is provided when the rear seat 13 is in the seating position, the third cable 90 will not be pulled even if the transfer link 82 were rotated.

When, on the other hand, the rear seat 13 is in the folding position, if the passenger operates the second lever 29, the third cable 90 will be pulled according to the rotation of the transfer link 82, because the end portion 90a of the third cable 90 and the cable connecting portion 86 of the transfer link 82 are in contact with each other. This causes the third locking plate 50 to rotate in the counterclockwise direction in FIG. 2, whereby the engagement between the third slot 54 of the third locking plate 50 and the third striker 34 is released. Therefore, the rear seat 13 can be returned to the seating position.

Now, a description will be made of the folding and removing operations of the above-mentioned folding seat 13.

Figure 8:
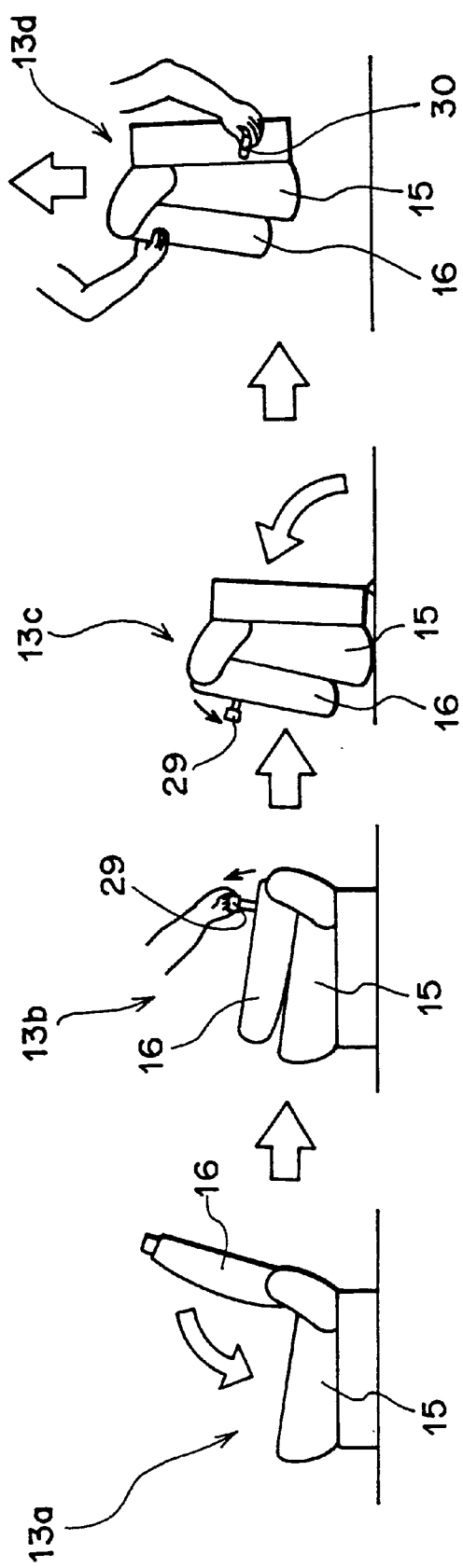
FIG. 8 illustrates pictorially how the seat shown in FIG. 1 is folded and removed according to the present invention.
Figure 9:
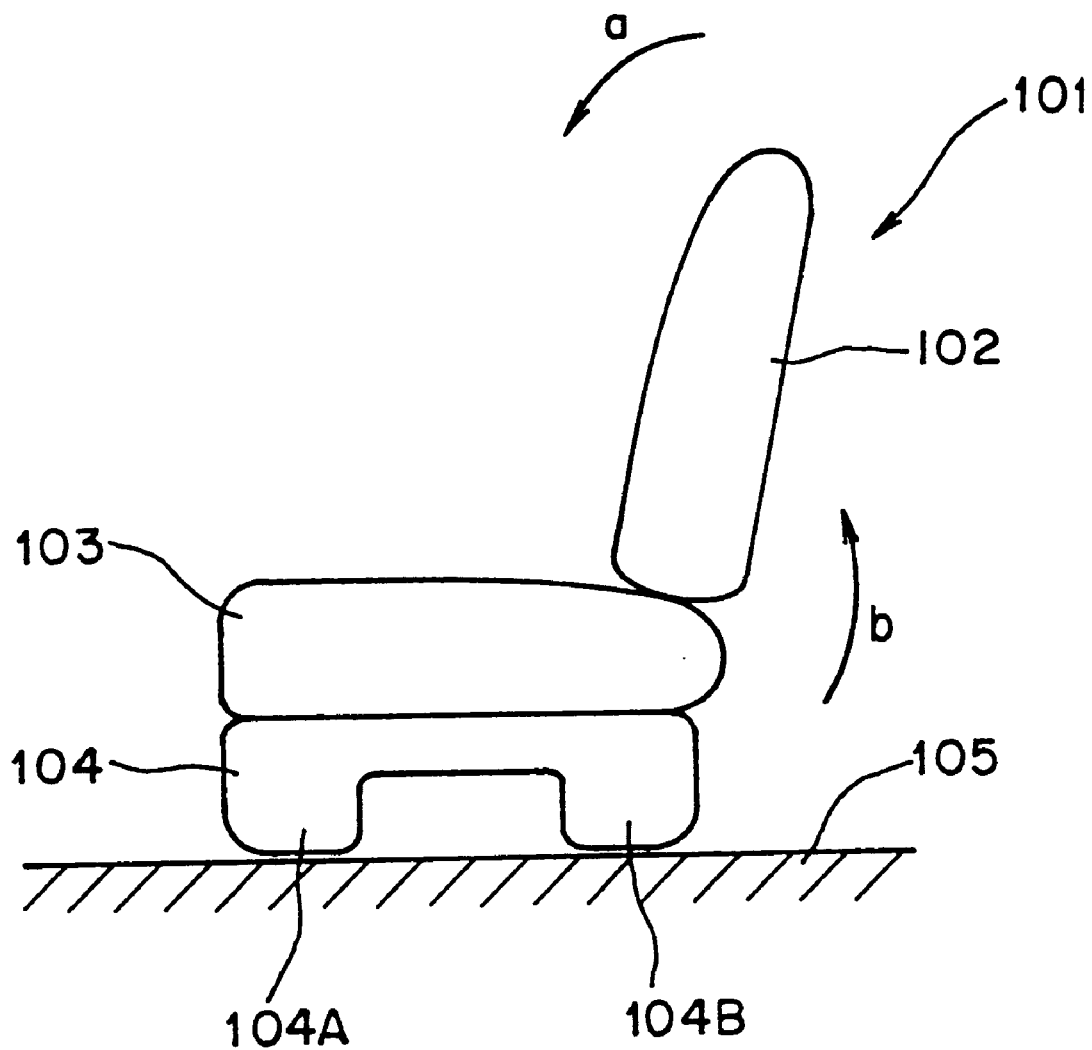
FIG. 9 is a side view showing a conventional seat.
Figure 10:
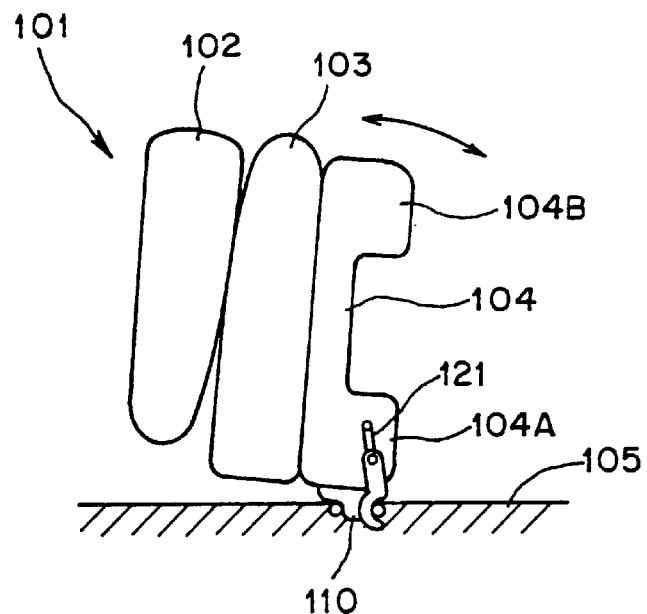
FIG. 10 is a side view showing the conventional seat shown in FIG. 9.
Figure 11:
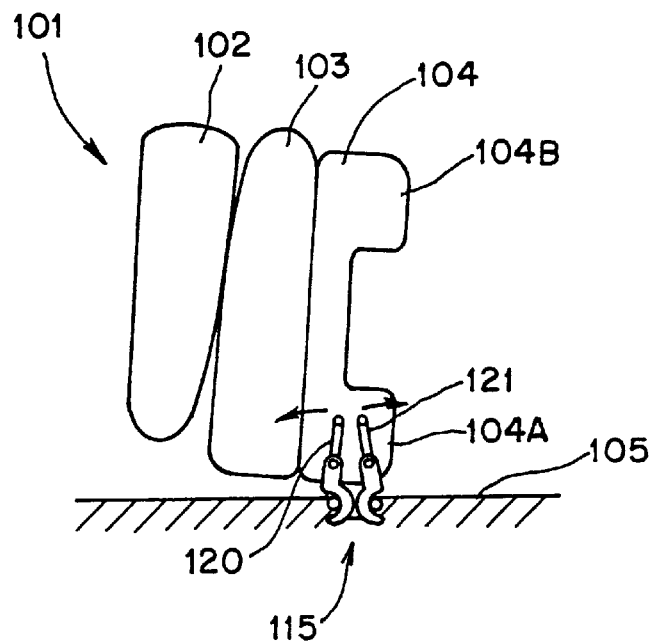
FIG. 11 is a side view showing another conventional seat.

As shown in FIG. 8, when the seat 13a is in the seating position where the seat cushion 15 (seat frame 21) is horizontal and the seat back 16 is at a predetermined inclined angle, in the front lock mechanism 26, the hook portion 44 of the first support bracket 41 engages the third striker 34 and also the first slot 48 of the first locking plate 46 engages the first striker 35. Also, in the rear lock mechanism 27, the second slot 67 of the second locking plate 64 engages the second striker 36. Therefore, the seat frame 21 is reliably locked to the floor 28 at the front and rear portions thereof.

As shown in FIG. 8, the seat back 16 is first tilted forward from the locked position denoted as 13a to the forward reclined position denoted as 13b by the operation of the forward tilting lever 25 so that the seat back 16 is closely attached to the seat cushion 15. Then, if the passenger pulls up the second lever 29, the transfer link 82 will be rotated in the clockwise direction through the first cable 87, and the cam member 68 of the rear lock mechanism 27 will be rotated in the counterclockwise direction through the second cable 88.

The counterclockwise rotation of the cam member 68 of the rear lock mechanism 27 causes the second locking plate 64 to rotate in the counterclockwise direction, whereby the engagement between the second slot 67 of the second locking plate 64 and the second striker 36 is released.

Therefore, as denoted at 13c in FIG. 8, the seat 13 can be tilted up and forward.

Note that when the seat 13 is in the seating position thereof, the lost motion stroke S1 is provided between the end portion 90a of the third cable 90 and the cable connecting portion 86 of the transfer link 82. Therefore, even if the passenger operates the second lever 29, the third cable 90 will not be pulled.

Accordingly, the spring force of the coil spring 52 wound on the third locking plate 50 is not transferred to the second lever 29 through the third cable 90. For this reason, the passenger can easily operate the second lever 29.

And if the seat 13 is tilted up forward, the relative rotation between the seat frame 21 and the first support bracket 41 will cause the guide pin 55 of the third locking plate 50 to move along the guide slot 57 and the third slot 54 to engage the third striker 34.

Therefore, the seat frame 21 is locked to the floor 28 in the folding position, and as shown by a two-dotted line in FIG. 2, the rear lock mechanism 27 is housed within the tilted seat frame 21.

When the seat frame 21 is locked in the folding position, the lost motion stroke S1 of the third cable 90 is absorbed as shown in FIG. 6. For this reason, the connecting end portion 90a of the third cable 90 and the cable connecting portion 86 of the transfer link 82 are closely attached with each other. At the same time, lost motion stroke S2 is provided between the end portion 88a of the second cable 88 and the cable connecting portion 85 of the transfer link 82.

If the passenger operates the first lever 30 while the seat 13 is in the folding position, the first locking plate 46 will be disengaged from the first striker 35 and the third locking plate 50 will be disengaged from the third striker 34.

Therefore, the engagement between the seat frame 21 and the floor 28 is released.

If the passenger lifts the seat frame 21 and seat back 16 in this state, the seat can be removed from the floor 28, as denoted at 13d in FIG. 8.

When attaching the removed seat 13d to the floor 28 again, the guide portions 43, 47, and 53 of the front lock mechanism 26 are first inserted into the front opening 32. With this insertion, the first slot 48, third slot 54, and hook portion 44 are caused to engage with the first and third strikers 34 and 33, respectively. Thus, as denoted at 13c in FIG. 8, the seat is locked in the folding position.

When the rear seat 13 is returned from the folding position 13c to the seating position 13a, the returning operation can be performed from either the front or the rear of the seat 13.

That is, from the rear of the seat 13, the first lever 30 can be operated.

If the passenger operates the first lever 30, the first locking plate 46 will be rotated and therefore the protruding portion 58 of the first locking plate 46 will push up the releasing pin 59 of the third locking plate 50. As a result, the third locking plate 50 is rotated in the counterclockwise direction and the third slot 54 is disengaged from the third striker 34.

On the other hand, from the front of the seat 13, the second lever 29 can be operated.

More specifically, when the seat 13 is in the folding position, the end portion 90a of the third cable 90 and the cable connecting portion 86 of the transfer link 82 are closely attached with each other. Therefore, if the passenger operates the second lever 29, the third cable 90 will be pulled through the first cable 87 and transfer link 82. This causes the guide pin 55 of the third locking plate 50 to move along the guide slot 57, whereby the third slot 54 of the third locking plate 50 is disengaged from the third striker 34.

As previously described, when the seat 13 is in the folding position, the lost motion stroke S2 is provided between the end portion 88a of the second cable 88 and the cable connecting portion 85 of the transfer link 82. For this reason, even if the passenger operates the second lever 29, the second cable 88 will not be pulled. Therefore, since the spring force of the spring 73, which is interposed between the cam member 68 and the second locking plate 64, is not transferred to the second lever 29 through the second cable 88, the passenger can easily operate the second lever 29.

According to the folding seat of the present invention, as described above, the seat can be locked with reliability to the floor, even when the seat is in the folding position. Furthermore, multiple lock mechanisms can be operated by a single lever, so the seat folding and removing operations become easy.

While the present invention has been described with reference to a preferred embodiment thereof, the invention is not to be limited to the details given herein, but may be modified within the scope of the appended claims. For example, the lock mechanism applicable to the present invention is not limited to the structure employed in the aforementioned embodiment. Also, in the aforementioned embodiment, although the seats are arranged along the longitudinal direction of the vehicle, they may be arranged along the lateral direction.

What is claimed is:

1. A removable folding seat comprising:

a seat frame extending in a longitudinal direction when said seat is in a seating position;

a first support bracket rotatably supported on a front lower portion of said seat frame;

a first locking member mounted to said first support bracket and removably locking said first support bracket to a floor;

a first lever mounted on said first support bracket and driving said first locking member between a first locking position in which said first support bracket is locked to said floor and an unlocking position in which said first support bracket is disengaged from said floor;

a second support bracket supported on a rear lower portion of said seat frame;

a second locking member mounted to said second support bracket and removably locking said second support bracket to said floor;

a second lever mounted to said second support bracket and driving said second locking member between a second locking position in which said second support bracket is locked to said floor and a disengaging position in which said second support bracket is disengaged from said floor; and a third locking member mounted to said first support bracket and holding said seat in a folding position in which a front portion of said seat frame is locked to said floor and also a rear portion of said seat frame is tilted up, said third locking member taking one of either a holding position in which said folding position is maintained and a releasing position in which said folding position is released, wherein said third locking member is driven from said holding position to said releasing position selectively by one of said first lever and said second lever.

2. The removable folding seat as set forth in claim 1, further comprising:

a transfer mechanism to transfer motion of said first lever to said third locking member when said seat is held in said folding position.

3. The removable folding seat as set forth in claim 2, further comprising:

a first striker secured to said floor; and a first slot formed on said first locking member, wherein said first locking member is supported on said first support bracket and wherein said first striker is housed within said first slot when said first locking member is in said first locking position and located outside said first slot when said first locking member is in said unlocking position.

4. The removable folding seat as set forth in claim 3, further comprising:

a first spring to urge said first locking member to take said first locking position.

5. The removable folding seat as set forth in claim 3, wherein said first lever is formed integrally on said first locking member.

6. The removable folding seat as set forth in claim 2, further comprising:

a third striker secured to said floor; and a third slot formed on said third locking member, wherein said third locking member is supported on said seat frame and wherein said third striker is housed within said third slot when said third locking member is in said holding position and located outside said third slot when said third locking member is in said releasing position.

7. The removable folding seat as set forth in claim 6, wherein, said transfer mechanism includes a protruding portion formed on said first locking member and a pin formed on said third locking member, and when said first locking member is driven from said first locking position to said unlocking position while said seat has been held in said folding position, said protruding portion abuts said pin and said third locking member is driven from said holding position to said releasing position.

8. The removable folding seat as set forth in claim 6, further comprising:

a guide slot formed on said first support bracket; and a guide pin protruding from said third locking member into said guide slot, said guide pin being moved along said guide slot when said seat rotates between said seating position and said folding position, wherein said third locking member is supported on said seat frame, and is driven between said releasing position and said holding position when said guide pin moves along said guide slot.

9. The removable folding seat as set forth in claim 6, wherein said third locking member is stored in said seat frame when said seat is in said seating position, and protrudes from said seat frame when said seat is in said folding position.

10. The removable folding seat as set forth in claim 6, further comprising:

a third spring to urge said third locking member to take said holding position.

11. The removable folding seat as set forth in claim 2, further comprising:

a set of first strikers formed in said floor, said set of first strikers being spaced from each other in a lateral direction of said seat;

a set of first locking members supported on said seat frame, said set of first locking members corresponding to said set of first strikers and being spaced from each other in said lateral direction of said seat; and a set of first slots respectively formed on said set of first locking members, wherein said set of first strikers are respectively housed within said set of first slots when said first locking member is in said first locking position and located outside said set of first slots when said first locking member is in said unlocking position.

12. The removable folding seat as set forth in claim 11, wherein said first lever extends in said lateral direction of said seat and connects said set of first locking members with each other.

13. The removable folding seat as set forth in claim 12, further comprising:

an auxiliary lever unmovably fixed to said seat frame, said auxiliary lever extending in said lateral direction of said seat and being spaced from said first lever by a predetermined distance in said longitudinal direction, wherein when said first lever is moved toward said auxiliary lever while said seat is in said folding position, said set of first locking members are driven from said first locking position to said unlocking position and also said third locking member is driven from said holding position to said releasing position.

14. The removable folding seat as set forth in claim 13, further comprising:

a first spring to urge said first lever to move in a direction away from said auxiliary lever.

15. The removable folding seat as set forth in claim 1, further comprising:

a transfer mechanism to transfer motion of said second lever to said third locking member when said seat is in said folding position.

16. The removable folding seat as set forth in claim 15, wherein, said seat includes a seat cushion mounted on said seat frame and a seat back, a lower end of said seat back being rotatably mounted to a rear end of said seat cushion, and said second lever is provided on a rear surface of said seat back.

17. The removable folding seat as set forth in claim 15, further comprising:

a second striker secured to said floor; and a second slot formed on said second locking member, wherein said second locking member is supported on said second support bracket and wherein said second striker is housed within said second slot when said second locking member is in said second locking position and located outside said second slot when said second locking member is in said disengaging position.

18. The removable folding seat as set forth in claim 17, further comprising:

a second spring to urge said second locking member to take said second locking position; and a cam supported on said second support bracket, said cam taking one of a first position where said second locking member is held in said second locking position against urging force of said second spring and a second position where said second locking member is held in said disengaging position, wherein said second lever drives said second locking member through said cam.

19. The removable folding seat as set forth in claim 18, further comprising:

a cable connected at one end thereof to said cam and at the other end to said second lever, wherein said second lever drives said cam through said cable.

20. The removable folding seat as set forth in claim 15, further comprising:

a third striker secured to said floor;

a third locking member supported on said seat frame; and a third slot formed on said third locking member, wherein said third locking member taking one of a holding position in which said third striker is located within said third slot and a releasing position in which said third striker is located outside said third slot.

21. The removable folding seat as set forth in claim 20, further comprising:

a guide slot formed on said first support bracket; and a guide pin protruding from said third locking member into said guide slot, said guide pin being moved along said guide slot when said seat rotates between said seating position and said folding position, wherein said third locking member is supported on said seat frame, and is driven between said releasing position and said holding position when said guide pin moves along said guide slot.

22. The removable folding seat as set forth in claim 21, wherein said third locking member is stored in said seat frame when said seat is in said seating position, and protrudes from said seat frame when said seat is in said folding position.

23. The removable folding seat as set forth in claim 20, further comprising:

a third spring to urge said third locking member to take said holding position.

24. The removable folding seat as set forth in claim 15, wherein said transfer mechanism transfers motion of said second lever to said second locking member when said seat is held in said seating position.

25. The removable folding seat as set forth in claim 24, wherein said transfer mechanism includes, a transfer link rotatably supported on said seat frame, said transfer link including a first connecting portion and a second connecting portion, a first connecting cable connected at one end thereof to said second lever and at the other end to said first connecting portion, said first connecting cable being pulled when said second lever is operated, and a second connecting cable connected at one end thereof to said second locking member and at the other end to said second connecting portion, said second connecting cable being pulled when said first connecting cable is pulled to rotate said transfer link, and wherein said second locking member is driven from said second locking position to said disengaging position by said second lever through said transfer link, first connecting cable, and second connecting cable.

26. The removable folding seat as set forth in claim 25, wherein said transfer mechanism inhibits said second lever from driving said second locking member when said seat is held in said folding position.

27. The removable folding seat as set forth in claim 26, wherein, when said seat is in said folding position, a lost motion stroke longer than a stroke driven by said second lever is provided between said second connecting portion and said second connecting cable.

28. The removable folding seat as set forth in claim 27, further comprising:

a second spring to urge said second locking member to take said second locking position; and a cam movably supported on said second support bracket, said cam taking either a first position where said second locking member is held in said second locking position or a second position where said second locking member is held in said disengaging position against urging force of said second spring;

wherein said lost motion stroke is set according to an amount of movement of said cam.

29. The removable folding seat as set forth in claim 15, wherein said transfer mechanism includes, a transfer link rotatably supported on said seat frame, said transfer link including a first connecting portion and a third connecting portion, a first connecting cable connected at one end thereof to said second lever and at the other end to said first connecting portion, said first connecting cable being pulled when said second lever is operated, and a third connecting cable connected at one end thereof to said third locking member and at the other end to said third connecting portion, said third connecting cable being pulled when said first connecting cable is pulled to rotate said transfer link, and wherein said third locking member is driven from said holding position to said releasing position by said second lever through said transfer link, first connecting cable, and third connecting cable.

30. The removable folding seat as set forth in claim 29, wherein said transfer mechanism inhibits said second lever from driving said third locking member when said seat is in said seating position.

31. The removable folding seat as set forth in claim 30, wherein, when said seat is in said seating position, a lost motion stroke longer than a stroke driven by said second lever is provided between said third connecting portion and said third connecting cable.

32. The removable folding seat as set forth in claim 31, further comprising:

a guide slot formed on said first support bracket; and a guide pin protruding from said third locking member into said guide slot, said guide pin being moved along said guide slot when said seat rotates between said seating position and said folding position, wherein said third locking member is supported on said seat frame, and is driven between said releasing position and said holding position when said guide pin moves along said guide slot, and wherein said lost motion stroke is set according to an amount of movement of said third locking member.

33. The removable folding seat as set forth in claim 15, wherein said transfer mechanism includes, a transfer link rotatably supported on said seat frame, said transfer link including a first connecting portion, a second connecting portion, and a third connecting portion;

a first connecting cable connected at one end thereof to said second lever and at the other end to said first connecting portion, said first connecting cable being pulled when said second lever is operated;

a second connecting cable connected at one end thereof to said second locking member and at the other end to said second connecting portion, said second connecting cable being pulled when said first connecting cable is pulled to rotate said transfer link; and a third connecting cable connected at one end thereof to said third locking member and at the other end to said third connecting portion, said third connecting cable being pulled when said first connecting cable is pulled to rotate said transfer link, wherein said second locking member is driven by said second lever from said second locking position to said disengaging position when said seat is in said seating position, and wherein said third locking member is driven by said second lever from said holding position to said releasing position when said seat is in said folding position.

34. The removable folding seat as set forth in claim 33, wherein, when said seat is in said seating position, said transfer mechanism allows said second lever to drive said second locking member and inhibits said second lever from driving said third locking member, and when said seat is in said folding position, said transfer mechanism allows said second lever to drive said third locking member and inhibits said second lever from driving said second locking member.

35. The removable folding seat as set forth in claim 34, wherein, when said seat is in said seating position, a first lost motion stroke longer than a stroke driven by said second lever is provided between said third connecting portion and said third connecting cable and wherein, when said seat is in said folding position, a second lost motion stroke longer than a stroke driven by said second lever is provided between said second connecting portion and said second connecting cable.

* * * * *